March 31, 1936.  L. H. MORSE  2,035,497
VALVE
Filed June 12, 1934
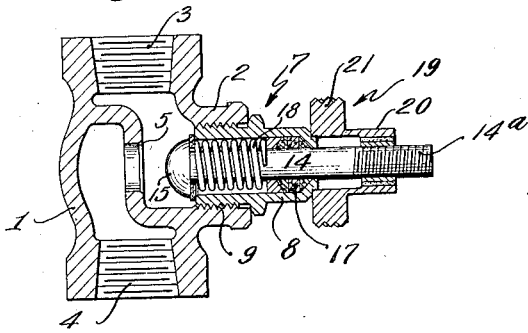
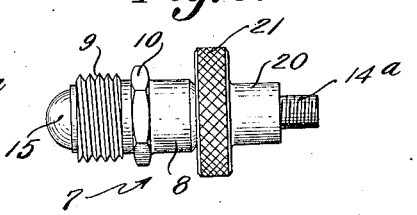
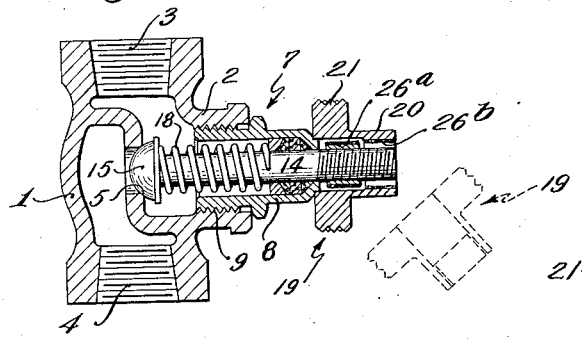
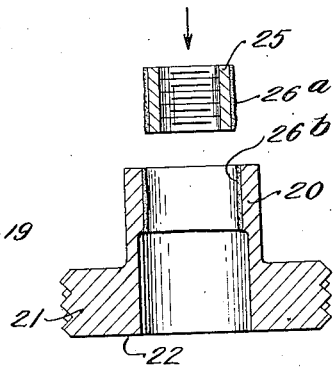
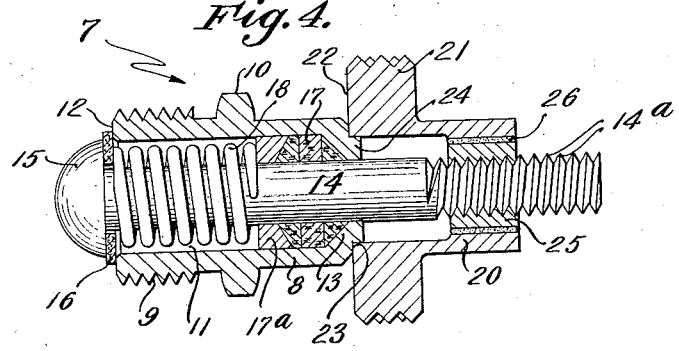
Inventor,
Lynn H. Morse,
by Roberts Cushman & Woodberg
Attys.

Patented Mar. 31, 1936

2,035,497

UNITED STATES PATENT OFFICE 2,035,497

VALVE

Lynn H. Morse, Natick, Mass.

Application June 12, 1934, Serial No. 730,246

6 Claims. (Cl. 137—162)

This invention pertains to thermostatically controlled check valves designed automatically to cut off the flow of fluid through a conduit when a heat-responsive element forming a part of the valve-actuating means is subjected to a predetermined temperature. While of more general utility, the improved valve is primarily designed for use in gas or fuel oil pipe lines, for example, the supply pipe for a gas or oil burner such as now commonly used in house heating apparatus and the like.

While it is customary, and in some localities legally necessary, to install a manually actuable cut-off valve in a gas or oil supply pipe at an accessible point remote from the burner or burners, it frequently happens that the need for cutting off the fuel supply does not become apparent until a fire of dangerous proportions has been started. On the other hand, if, immediately upon abnormal rise in temperature at or in the vicinity of the burner, the fuel supply were automatically cut off, this in itself might in many instances be sufficient to avoid the starting of a fire or injury to the heating apparatus by reason of exposure to excess heat. Under some conditions it may be desirable not only to cut off the fuel supply automatically whenever a dangerously high temperature is generated, but also to make it difficult for the user of the device to turn on the fuel supply again until the cause of the difficulty has been ascertained and remedied.

In accordance with the present invention I provide a cut-off or check valve in the fuel feed line, preferably at a point such that it is directly exposed to heat evolved from the burner, although under certain conditions I contemplate the location of the valve at other points where excessive heat may be generated or exist; in fact, a plurality of such valves may be located in the supply line at various points as conditions may indicate to be proper. This improved cut-off or check valve is so designed as to leave the fuel passage freely open under normal conditions, but comprises a shut-off element and motor means operative automatically to actuate such element so as to shut off the fuel supply whenever the temperature reaches a predetermined point. In a preferred construction, I provide for manual closure or regulation of the valve without in any way interfering with its automatic operation. A convenient motor means comprises a stressed spring normally kept from acting by a fusible element which softens or melts and allows the spring to close the valve whenever the fusible element is exposed to the predetermined temperature.

Preferably the valve feather or valve head (that is to say the movable closure element) its actuating motor spring, and the restraining fusible element are all so associated as to be applicable to or removable from the valve casing as a unit, and in one desirable embodiment this control unit is of such type that it may be installed in a valve casing of usual commercial construction without necessitating any change in such casing. Thus, for example, if a pipe line be provided with an ordinary manually actuable cut-off valve, my improved control unit may be installed in the line merely by removing the standard valve feather 15 and associated parts from the casing and substituting my improved control unit therefor.

In the accompanying drawing in which I have illustrated certain embodiments of the invention by way of example,

Fig. 1 is a vertical section through a valve casing of a common type having associated therewith a preferred form of my control unit, the valve being shown in wide open position;

Fig. 2 is a view similar to Fig. 1, showing the valve fully closed and indicating in broken lines how one element of the restraining device commonly separates completely from the valve when the valve automatically closes;

Fig. 3 is a side elevation of the complete control unit removed from the valve casing;

Fig. 4 is a vertical section, to larger scale, showing the control unit in set position and removed from the casing; and Fig. 5 is a vertical section showing the separate parts of the restrainer device properly positioned preparatory to reuniting them after the valve has automatically closed.

Referring to the drawing, the numeral 1 designates the valve casing, which may be a casting, drop forging, or of other suitable construction, such casing preferably being of more or less T-shape, having the stem portion 2 and a transverse portion provided at its opposite ends with internally screw-threaded sockets 3 and 4 adapted to receive sections of a supply pipe, for example, a pipe leading from an oil supply tank or reservoir to a burner. Usually in such installations a manually operable valve is arranged at a point adjacent to the reservoir so that the flow of fuel may be shut off manually when desired and from a point remote from the burner.

The valve casing 1 has an annular valve seat 5 defining a passage through which fluid may flow from one of the pipe sections to the other section so long as the valve is open. This passage is free and unobstructed under normal conditions.

Referring to the drawing, the preferred form of fluid flow control unit 7 which I employ in connection with the valve casing 1 comprises a cylindrical plug or shell member 8 having screw threads 9 near one end adapted to engage the internally screw-threaded bore of the stem 2 of the valve casing. Preferably this cylindrical plug 8 is furnished with a polygonal flange 10 for engagement by a wrench. The cylindrical plug or shell 8 has an internal chamber 11, and the annular left-hand end surface (as viewed in Fig. 4) of this shell constitutes a flat annular seat 12.

At the opposite end the shell or plug 8 has an inturned annular flange portion 13 which forms a guide for the valve stem 14. At one end, this valve stem is provided with a head 15, constituting the valve feather, here shown as of substantially hemispherical form, the curved surface of which is adapted to engage the seat 5 of the valve casing when the valve is closed and to make a fluid-tight joint with the valve seat 5. Surrounding the valve stem 14 and engaging the flat side of the head or feather 15 of the valve is an annular sealing member 16, preferably of more or less compressible material such as rubber, indurated fiber, asbestos composition, bearing metal or the like, adapted at times to make a close fluid-tight contact with the seat surface 12.

One or more compressible washers 17, for example washers of cork, felt or the like, are arranged so as to encircle the valve stem 14 and to rest against the inner surface of flange 13 of the shell 8, and a metal washer 17ª also encircles the valve stem 14 and is adapted to engage the left-hand washer 17, as viewed in Fig. 4. A coiled compression spring 18 encircles the valve stem 14 and bears at one end against the member 16 and at the other against the member 17ª. This spring constitutes the valve actuating motor and is normally stressed more or less,—tending to move the valve stem and the valve head 15 to the left as viewed in Figs. 1, 2 and 4.

The restrainer device 19 preferably comprises a cylindrical sleeve-like member 20 of an internal diameter somewhat greater than that of the valve stem and preferably having a radial flange 21 whose outer edge is knurled so as to permit the retainer device to be rotated readily by hand. The flange 21 is furnished with a substantially flat radial face 22 (Fig. 4) adapted to engage a flat, radial, annular surface 23 formed at the outer side of the flange 13 of the shell 8, said flange having an annular rib or projection 24 which fits within the sleeve portion of the restrainer device 19 and normally holds the latter in coaxial relation to the valve stem.

The stem 14 of the valve extends through the sleeve 20 of the restrainer device and has screw threads 14ª at its righthand end, as viewed in Fig. 4, for engagement with an internally screw-threaded collar or nut 25 of such external diameter as to permit it to enter freely into the sleeve 20. A thin annular layer 26 of fusible material is interposed between the outer periphery of the collar or nut 25 and the inner surface of the sleeve member 20, and normally unites these parts, thereby preventing axial movement of the valve stem 14 except by rotation of the latter relative to the collar or nut 25.

The connecting layer 26 of fusible material may be made by first coating the outer surface of the collar 25 with fusible material and likewise coating the inner surface of the sleeve 20 with fusible material and then driving the collar 25 into the sleeve 20 so as to cause the films of fusible material on these two parts to cohere. If the coatings be of proper relative diameters, the rubbing of one surface of fusible material in driving the collar 25 into the sleeve 20 is sufficient to provide bright surfaces which molecularly unite, forming a substantially integral union even though the parts are cold. In the initial assembly of the parts 20 and 25 by the manufacturer, it may be preferable to tin their opposed surfaces and sweat them together by the application of heat. Preferably the fusible material is of a nature which melts at a relatively low temperature, for example, a temperature in the neighborhood of 170° F., although it is obvious that the fusible material may be selected so as to melt at substantially any desired temperature.

The control unit comprising the shell member 8 and its enclosed parts together with the valve stem are assembled with the restrainer device by securing the latter onto the threaded end of the valve stem, the surface 22 of the restrainer device engaging the surface 23 of the shell 8 so that upon relative rotation of the parts 8 and 21 the spring 18 is placed under compression and the sealing stem is drawn inwardly until the annular sealing member 16 is brought forcibly against the seat 12 so as to provide a leak-tight joint between these parts. At the same time the pressure of the spring 18 exerted against the washer 17ª compresses the resilient or yielding washers 17 so as to furnish further security against leakage of fluid longitudinally of the valve stem.

The shell or plug 8 with the assembled parts is now inserted in the stem portion 2 of the valve casing and screwed up snugly to prevent leakage of fluid between the outer surface of the shell 8 and the valve casing. With the parts thus arranged, as shown in Fig. 1, the valve 15 may be held fully open and away from the seat 5, or by turning the member 21 the valve may be caused to approach its seat 5 to a greater or less extent.

If after installation of the valve the temperature of the surroundings should rise sufficiently to cause the fusible material 26 to become soft or melt, the spring 18, being under compression, will cause the part 25 to slip axially relatively to the part 20 and the valve feather 15 will be seated against the seat 5. Ordinarily when this action takes place the recoil of the spring causes the member 20, 21 of the restrainer device to snap completely off of the valve stem regardless of the position of the valve device, as indicated in dotted lines in Fig. 2, (such separation of the restrainer device from the other valve parts serving as a signal or indicator that the valve has closed) although under some circumstances restrainer may remain loose upon the outer end of the valve stem as shown in full lines in Fig. 2. As indicated in Figs. 2 and 5, the melting of the fusible material, which permits this separation of the parts 20 and 25, leaves a film 26ª and 26ᵇ on the parts 25 and 21, respectively.

For restoring the valve to its normal condition, it is merely necessary to move the part 25 downwardly in axial alignment with the part 21, as indicated in Fig. 5, and when the parts contact, to strike the part 25 with a hammer so as to drive it down into the part 21. The frictional contact of the films 26ª and 26ᵇ will again cause them integrally to cohere. Thereupon, by screwing the parts 21 and 25 onto the valve stem the valve may again be opened and restored to the position shown in Fig. 1. Preferably the valve stem is provided with a left-hand screw thread so that by turning the member 21 in the right-hand direction, the valve will be caused to close.

It may be noted that the disposition of the fusible material is such that it is protected from mechanical injury during operation of the valve and, furthermore, that a very thin film or layer of this material is all that is required to hold the parts in normal position. The employment of a thin layer of this material is advantageous, not only from the standpoint of lessened cost of production, but also since it melts very readily and completely when the temperature of the sleeve member 20 reaches the fusion point of the fusible material, as there is no substantial body of the fusible material which must first be heated before it can yield. Furthermore, this material yields to a shear action rather than to compression, and in the thin film provided, exhibits no tendency gradually to deform at normal temperatures and allow the valve to close as has been found to occur when a long cylinder of such material under axial compression is used for holding the valve open.

It may be noted that the control unit as herein disclosed is of simple construction and applicable to existing valves without change in the latter, and that when the valve is wide open leakage of gas or fluid longitudinally of the unit is prevented by the two-fold protection afforded by the sealing member 16 engaging the seat 12 and the compressible washers 17 which are held under compression by the action of the spring. Even when the valve is partially open these compressible washers 17 provide a tight joint to prevent leakage of fluid longitudinally of the stem, although these washers need not, when uncompressed, engage the stem of the valve so snugly as substantially to interfere with the closure of the valve.

While I have illustrated one desirable embodiment of the invention by way of example, I wish it to be understood that the invention is capable of embodiment in other specific constructions and that all changes in size, proportion of parts, materials employed, and relative arrangement of parts, and which may appear desirable under varying conditions of use, may be made without departing from the invention as defined in the appended claims.

I claim:

1. A fluid flow control unit comprising a part constructed and arranged to be united to a valve casing having therein a valve seat, said unit also comprising a valve head adapted to be disposed in coaxial relation to the valve seat, an axially movable valve stem fixedly secured to the valve head, a spring tending to move the valve head toward the valve seat, and setting means operative to move the valve head away from its seat and concomitantly to stress the spring, said setting means comprising a restraining member free from but normally abutting a fixed part of said unit, said restraining member being rotatable and coaxial with the valve seat, the restraining member having a knurled actuating flange and a cylindrical bore, a nut member disposed within the cylindrical bore of the restraining member and having screw-threaded engagement with said stem, and a film of fusible material interposed between and normally uniting the nut member and the restraining member so that the nut member turns with the restraining member but is normally held by the latter at a fixed distance from the valve seat, said fusible material, when softened by heat, yielding to shearing stress and allowing the nut to slip axially of the restraining member thereby to allow the valve to close and concomitantly to allow the restraining member to be freely removed from the other parts of the device.

2. A fluid flow control unit of the class described comprising a plug constructed and arranged to be screwed into a valve casing, said plug having an axial chamber, a valve stem extending longitudinally of the chamber, a valve head at one end of the stem, a spring within said chamber arranged to urge the valve head outwardly from the chamber, and restraining means normally preventing such movement of the valve head, said restraining means comprising an actuating flange and a tubular member normally abutting a portion of the plug, the latter having an annular projection coaxial with and fitting into said tubular member, an internally screw-threaded nut member disposed within said tubular member and engaging a screw-threaded portion of the valve stem, and a layer of fusible material interposed between said tubular member and the nut member and normally uniting said members.

3. A fluid flow control unit of the class described comprising a plug constructed and arranged to be screwed into a valve casing in coaxial relation to a valve seat in the latter, said plug having an axial chamber, a valve stem extending longitudinally of the chamber, a valve head at one end of the stem, a spring within said chamber arranged to urge the valve head outwardly from the chamber, and restraining means normally preventing such movement of the valve head, said restraining means comprising a rotary member having a knurled flange for manually turning it and a hollow cylindrical part disposed in axial alignment with said chamber, said rotary member also having a radial surface normally abutting a complemental coaxial radial surface on the plug, an internally screw-threaded nut disposed within said cylindrical part and normally spaced from the plug, and fusible material interposed between and normally uniting the peripheral surface of the nut member to the inner peripheral surface of the cylindrical part.

4. A fluid flow control unit of the class described comprising a plug constructed and arranged to be screwed into a valve casing of usual type in coaxial relation to a valve seat in the latter, said plug having an axial chamber open at the end which enters the valve casing, a valve head cooperable with the valve seat in the casing, a valve stem extending axially of the chamber in the plug and secured to the valve head, a spring within the chamber tending to move the valve head toward valve-closing position, restraining means normally preventing movement of the valve head toward valve closing position, said restraining means comprising an elongate sleeve member having a peripheral knurled flange adjacent to one end, said latter end normally abutting the end surface of the plug but being free from the latter, an internal screw-threaded collar telescoped within the other end of the sleeve member, a layer of fusible material normally uniting the collar to the sleeve member, and a pair of elements spaced axially of the valve stem and independently operative, when the valve is fully open, to prevent leakage of fluid axially of the valve stem from the valve casing.

5. A fluid flow control unit of the class described comprising a screw-threaded plug constructed and arranged to be united to a screw-threaded valve casing in coaxial relation to a valve seat in the latter, said plug having an axial chamber open at the end which engages the valve casing, a valve head adapted to cooperate with the valve seat in the casing, a valve stem connected at one end to and coaxial with the head and extending axially of the chamber in the plug, the opposite end portion of the stem being screw threaded, a nut engaging said screw-threaded portion of the stem, a helical spring encircling the valve stem within the chamber in the plug and tending to move the valve stem axially thereby to seat the valve head, a manually rotatable restrainer device, a fusible element normally uniting the restrainer device to the nut, the restrainer device being free from but adapted normally to be held in contact with a portion of the plug merely by the reaction of the spring thereby under normal conditions to hold the valve open, the restrainer device being normally operative by rotation to turn the nut and thereby adjust the valve head toward and from its seat, the valve stem and nut being releasable from the restrainer device when the temperature becomes high enough to melt the fusible element whereupon the spring automatically closes the valve and the restrainer device is freed from the plug, and means to prevent leakage of fluid along the valve stem when the valve is fully open, said leak-preventing means comprising a compressible washer which embraces the stem, the spring being so arranged as to cause said stem-embracing washer to bear most firmly against the stem when the valve head is fully retracted from its seat.

6. A fluid flow control unit of the class described comprising a plug constructed and arranged to be united to a valve casing in coaxial relation to a valve seat in the latter, said plug having an axial chamber open at that end which is adapted to engage the valve casing, said end of the plug being constructed and arranged to constitute an annular seat, a valve head cooperable with the valve seat in the casing, an annular sealing member associated with said valve head and cooperable with the annular seat at the end of the plug to close said chamber when the valve is fully open, a spring within the chamber in the plug normally urging the valve head outwardly from the chamber toward the seat in the casing, said spring being completely housed within the chamber when the valve is fully open, a valve stem secured to the valve head and extending longitudinally of the chamber in the plug, and valve-setting means comprising a rotary element having abutting engagement with a complemental part of the plug and comprising a part having screw-threaded engagement with the valve stem, the rotation of said part in one direction causing the stem to move axially and thereby stress the spring until said annular sealing member is brought into contact with its seat, said setting means also comprising a fusible restraining element which softens when exposed to a predetermined temperature and thereby permits the spring to move the valve head toward the seat in the casing.

LYNN H. MORSE.